(12) United States Patent
Cai et al.

(10) Patent No.: US 12,221,159 B2
(45) Date of Patent: Feb. 11, 2025

(54) CHASSIS, VEHICLE, DEVICE FOR MANUFACTURING VEHICLE AND METHOD FOR MANUFACTURING VEHICLE

(71) Applicant: CONTEMPORARY AMPEREX TECHNOLOGY (HONG KONG) LIMITED, Hong Kong (CN)

(72) Inventors: Rulai Cai, Ningde (CN); Liwen Jiang, Ningde (CN); Fuping Luo, Ningde (CN); Tingting Zhu, Ningde (CN); Wumei Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 360 days.

(21) Appl. No.: 17/564,454

(22) Filed: Dec. 29, 2021

(65) Prior Publication Data
US 2022/0135133 A1  May 5, 2022

Related U.S. Application Data

(63) Continuation of application No. PCT/CN2020/124976, filed on Oct. 29, 2020.

(51) Int. Cl.
*B62D 21/14* (2006.01)
*B60K 1/04* (2019.01)

(52) U.S. Cl.
CPC ............... *B62D 21/14* (2013.01); *B60K 1/04* (2013.01); *B60K 2001/0438* (2013.01)

(58) Field of Classification Search
CPC ............................ B62D 49/0678; B62D 21/14
See application file for complete search history.

(56) References Cited

U.S. PATENT DOCUMENTS 10,370,033 B1 *  8/2019  Klein .................. B62D 21/20
2010/0148475 A1   6/2010  Serre
(Continued)

FOREIGN PATENT DOCUMENTS

CH         314531 A  *  6/1956
CN      101391622 A      3/2009
(Continued)

OTHER PUBLICATIONS

Yilong Chen, Two-way telescopic vehicle frame and working method thereof, May 8, 2018, EPO, CN 108001536 A, Machine Translation of Description (Year: 2018).*

(Continued)

*Primary Examiner* — James A English
(74) *Attorney, Agent, or Firm* — Scully, Scott, Murphy & Presser, P.C.

(57) ABSTRACT

The present application provides a chassis, a vehicle, a device for manufacturing a vehicle and a method for manufacturing a vehicle. The chassis includes at least two movable bodies that are continuously arranged along a first preset direction, and by adjusting a position of at least one movable body in the first preset direction, a length of the chassis in the first preset direction can be changed so as to enable the chassis to adapt to the vehicle body of a different length. Since each movable body is provided at an adjacent movable body thereof with a position adjustable in a preset direction, the chassis is made into a telescopic structure that is adjustable in length. The length of the chassis can be adjusted according to the requirements to enable the chassis to adapt to the vehicle body of a different length.

13 Claims, 8 Drawing Sheets

(56) References Cited

U.S. PATENT DOCUMENTS

| | | | |
|---|---|---|---|
| 2013/0206496 A1 | 8/2013 | Hashimoto | |
| 2021/0253170 A1* | 8/2021 | Matsunami | B60P 3/42 |

FOREIGN PATENT DOCUMENTS

| | | |
|---|---|---|
| CN | 102139708 A | 8/2011 |
| CN | 102470893 A | 5/2012 |
| CN | 206521197 U | 9/2017 |
| CN | 108001536 A | 5/2018 |
| CN | 109383638 A | 2/2019 |
| CN | 110435767 A | 11/2019 |
| CN | 110588788 A | 12/2019 |
| CN | 210555258 U | 5/2020 |
| CN | 211107699 U | 7/2020 |
| CN | 211196368 U | 8/2020 |
| CN | 211659259 U | 10/2020 |
| GB | 2470105 A * | 11/2010 ............. B62D 21/14 |
| KR | 20110019134 A * | 2/2011 |
| WO | 2020109498 A1 | 6/2020 |

OTHER PUBLICATIONS

Yun Sun Oh, Frame Expansion Apparatus for Four Wheel Vehicle, Feb. 25, 2011, KR 10-2011-0019134 A, Machine Translation of Description (Year: 2011).*

Liu et al., Full-bearing frame for logistics vehicle, Jul. 28, 2020, EPO, CN 211107699 U, Machine Translation of Description (Year: 2020).*

Maurice Werro, Self-propelled vehicle, Jun. 15, 1956, EPO, CH 314531 A, Machine Translation of Description (Year: 1956).*

First Office Action dated Feb. 24, 2023 received in Chinese patent Application No. CN 202080097560.7.

Extended European Search Report dated Jun. 23, 2022 received in European Patent Application No. EP 20934880.4.

* cited by examiner

CHASSIS, VEHICLE, DEVICE FOR MANUFACTURING VEHICLE AND METHOD FOR MANUFACTURING VEHICLE

CROSS-REFERENCE TO RELATED APPLICATIONS

This application is a continuation of International Application No. PCT/CN2020/124976, filed on Oct. 29, 2020, the disclosure of which is hereby incorporated by reference in its entirety.

TECHNICAL FIELD

The present application relates to the technical field of vehicles and specifically relates to a chassis, a vehicle, a device for manufacturing a vehicle and a method for manufacturing a vehicle.

BACKGROUND

In the vehicle, the chassis functions to support and mount power elements (an engine or a motor etc.), a vehicle body and other members, and the chassis and the vehicle body are connected together to form an entire model of an automobile. At present, the chassis of the vehicle has a fixed size and the chassis of a fixed-length only adapts to one particular vehicle body, resulting in single user experience.

SUMMARY

Embodiments of the present application provide a chassis, a vehicle, a device for manufacturing a vehicle and a method for manufacturing a vehicle to improve the current problem that the chassis only adapts to one particular vehicle body.

According to a first aspect, embodiments of the present application provide a chassis for a vehicle, where the chassis includes at least two movable bodies that are continuously arranged along a first preset direction;
  each movable body is provided at an adjacent movable body thereof with a position adjustable in the first preset direction, and by adjusting a position of at least one movable body in the first preset direction, a length of the chassis in the first preset direction can be changed so as to enable the chassis to adapt to a vehicle body of a different length.

In the above solution, each movable body is provided at an adjacent movable body thereof with a position adjustable in a preset direction, such that the chassis is made into a telescopic structure that is adjustable in length, and the length of the chassis can be adjusted according to the requirements to enable the chassis to adapt to the vehicle body of a different length. Regarding requirements for a different driving scene of a user, the vehicle body of a different length can be replaced onto the chassis so as to satisfy driving requirements and improve user experience.

In addition, the chassis provided in embodiments of the present application further has the following additional technical features:

In some embodiments, at least one movable body of the at least two movable bodies is provided with an accommodating space for accommodating a battery cell.

In the above solution, at least one movable body in the chassis is provided with an accommodating space. The battery cell that provides electrical energy can be placed into the accommodating space. By fully using the internal space of the movable body, integration and integrity of the battery cell and the chassis can be realized, which can efficiently increase a ground clearance of the battery cell. Therefore, it is not easy to damage the battery cell.

In some embodiments, the at least two movable bodies includes:
  a first movable body for mounting a front wheel; and
  a second movable body for mounting a rear wheel.

In the above solution, the first movable body and the second movable body are respectively configured to mount the front wheel and the rear wheel, that is, by changing positions of the first movable body and the second movable body, adjustment for a wheel base of the chassis can be realized while changing a length of the chassis. When the length of the chassis increases by changing positions of the first movable body and the second movable body, the wheel base of the chassis increases; and when the length of the chassis decreases by changing positions of the first movable body and the second movable body, the wheel base of the chassis decreases.

In some embodiments, the at least two movable bodies further includes a third movable body provided with an accommodating space for accommodating a battery cell; and
  the first movable body, the third movable body and the second movable body are arranged in order in the first preset direction.

In the above solution, the first movable body, the third movable body and the second movable body are arranged in order in the first preset direction. It can be understood that the first movable body and the second movable body are connected through the third movable body. Since the first movable body is configured to mount the front wheel and the second movable body is configured to mount the rear wheel, an accommodating space for accommodating a battery cell is provided on the third movable body, resulting in a compact entire structure and reasonable layout.

In some embodiments, the third movable body includes:
  a first longitudinal beam arranged along the first preset direction;
  a second longitudinal beam arranged along the first preset direction;
  a first cross beam arranged along a second preset direction and connected between the first longitudinal beam and the second longitudinal beam; and
  a second cross beam arranged along the second preset direction and connected between the first longitudinal beam and the second longitudinal beam; where
  the first longitudinal beam, the second longitudinal beam, the first cross beam, and the second cross beam jointly define the accommodating space.

In the above solution, the third movable body includes a first longitudinal beam, a second longitudinal beam, a first cross beam and a second cross beam, the four of which jointly define the accommodating space. Such a third movable body is simple in structure and has a very favorable structural stability.

In some embodiments, the first movable body includes:
  a first connecting beam provided at the first longitudinal beam with a position adjustable in the first preset direction;
  a second connecting beam provided at the second longitudinal beam with a position adjustable in the first preset direction; and
  an external cross beam, through which the first connecting beam and the second connecting beam are connected.

In the above solution, the first connecting beam and the second connecting beam of the first movable body are connected through the external cross beam. Such a structure enables the first movable body to have a favorable integrity. The first connecting beam and the second connecting beam are adjustably provided at the first longitudinal beam and the second longitudinal beam respectively in the first preset direction and by adjusting positions of the first connecting beam and the second connecting beam, stable adjustment for the position of the first movable body can be realized.

In some embodiments, the first connecting beam is provided at one end of the external cross beam with a position adjustable in the second preset direction; and the second connecting beam is provided at another end of the external cross beam with a position adjustable in the second preset direction.

In the above solution, the first connecting beam and the second connecting beam are provided at two ends of the external cross beam respectively with positions adjustable in the second preset direction and by adjusting positions of the first connecting beam and the second connecting beam, a distance between the first connecting beam and the second connecting beam in the second preset direction can be changed, such that a width of the first movable body is adjustable in the second preset direction. The user can adjust the width of the first movable body in the second preset direction according to the requirements.

In some embodiments, the first connecting beam includes a first connecting portion and a second connecting portion connected to the first connecting portion;

the second connecting beam includes a third connecting portion and a fourth connecting portion connected to the third connecting portion;

the first connecting portion and the third connecting portion are respectively configured to be plugged into and matched with the first longitudinal beam and the second longitudinal beam in the first preset direction; and the second connecting portion and the fourth connecting portion are respectively configured to be plugged into and matched with to two ends of the external cross beam in the second preset direction.

In the above solution, by respective plug-cooperation of the first connecting portion of the first connecting beam and the third connecting portion of the second connecting beam to the first longitudinal beam and the second longitudinal beam, it can be realized that the position of the first movable body is adjustable in a simple manner, such that rapid dismounting and mounting of the first movable body and the third movable body can be realized conveniently. In the process of adjusting the position of the first movable body, the first connecting portion will move relative to the first longitudinal beam, the third connecting portion will move relative to the second longitudinal beam and the first longitudinal beam and the second longitudinal beam perform a good directing function respectively for the first connecting portion and the third connecting portion, thereby enabling stability of the first movable body relative to the moving process of the third movable body. By respective plug-cooperation of the second connecting portion of the first connecting beam and the fourth connecting portion of the second connecting beam to two ends of the external cross beam, it can be realized that positions of the first connecting beam and the second connecting beam are adjustable in a simple manner, such that rapid dismounting and mounting of the first connecting beam, the second connecting beam and the external cross beam can be realized conveniently. In the process of adjusting positions of the first connecting beam and the second connecting beam, the second connecting portion of the first connecting beam and the fourth connecting portion of the second connecting beam will move relative to the external cross beam, and the external cross beam performs a good directing function for the first connecting beam and the second connecting beam, thereby enabling stability of the first connecting beam and the second connecting beam relative to the moving process of the external cross beam.

In some embodiments, the first cross beam is a telescopic structure that is telescopic along the second preset direction; and the second cross beam is a telescopic structure that is telescopic along the second preset direction.

In the above solution, the first cross beam and the second cross beam are both telescopic structures that are telescopic along the second preset direction, and through expansion of the first cross beam and the second cross beam, a distance between the first longitudinal beam and the second longitudinal beam can be changed, thus realizing that a width of the third movable body is adjustable in the second preset direction.

In some embodiments, the first cross beam is provided at the first longitudinal beam and the second longitudinal beam with a position adjustable along the first preset direction, the first cross beam is connected to the first movable body, and by adjusting a position of the first movable body, a position of the first cross beam can be changed to adjust a size of the accommodating space; and/or the second cross beam is provided at the first longitudinal beam and the second longitudinal beam with a position adjustable along the first preset direction, the second cross beam is connected to the second movable body, and by adjusting a position of the second movable body, a position of the second cross beam can be changed to adjust a size of the accommodating space.

In the above solution, by adjusting the position of the first movable body, the position of the first cross beam can be changed, thus achieving the purpose of adjusting a size of the accommodating space. When the length of the chassis increases by adjusting the position of the first movable body, the first cross beam will move following the first movable body, such that the accommodating space enclosed by the first longitudinal beam, the second longitudinal beam, the first cross beam and the second cross beam increases. Therefore, more battery cells can be accommodated in the accommodating space. Similarly, by adjusting the position of the second movable body, the position of the second cross beam can be changed, thus achieving the purpose of adjusting a size of the accommodating space. When the length of the chassis increases by adjusting the position of the second movable body, the second cross beam will move following the second movable body, such that the accommodating space enclosed by the first longitudinal beam, the second longitudinal beam, the first cross beam and the second cross beam increases. Therefore, more battery cells can be accommodated in the accommodating space.

In some embodiments, the third movable body further includes:

a support beam, where at least one support beam is connected between the first longitudinal beam and the second longitudinal beam and/or between the first cross beam and the second cross beam to split the accommodating space into a plurality of accommodating grids for accommodating the battery cell.

In the above solution, at least one support beam is connected between the first longitudinal beam and the second longitudinal beam and/or between the first cross beam and the second cross beam, and the support beam can perform a good enforcing function for a frame structure enclosed by the first longitudinal beam, the second longitudinal beam, the first cross beam and the second cross beam, thereby improving strength and rigidness of the third movable body.

In some embodiments, the at least two movable bodies further includes:
- a third movable body, where the first movable body, the third movable body and the second movable body are arranged in order in the first preset direction; and the first movable body, the third movable body and the second movable body jointly define an accommodating space for accommodating a battery cell.

In the above solution, the first movable body, the third movable body and the second movable body jointly define an accommodating space for accommodating a battery cell. Such a structure enables change of the accommodating space's size upon adjusting positions of the first movable body and the second movable body. When the length of the chassis increases by adjusting the position of the first movable body, the accommodating space increases. Therefore, more battery cells can be accommodated in the accommodating space. When the length of the chassis increases by adjusting the position of the second movable body, the accommodating space increases. Therefore, more battery cells can be accommodated in the accommodating space.

In some embodiments, the third movable body includes a first longitudinal beam and a second longitudinal beam arranged along the first preset direction, and the first longitudinal beam, the second longitudinal beam, the first movable body and the second movable body jointly define the accommodating space.

In the above solution, the first longitudinal beam and the second longitudinal beam of the third movable body jointly define the accommodating space together with the first movable body and the second movable body, thereby simplifying the structure of the third movable body while ensuring favorable bearing ability for the third movable body, in which case the chassis can be made lightweight.

In some embodiments, the chassis further includes:
- a locking unit for locking or releasing two adjacent movable bodies;
- when the locking unit locks the two adjacent movable bodies, relative positions of the two adjacent movable bodies are fixed; and
- when the locking unit releases the two adjacent movable bodies, relative positions of the two adjacent movable bodies are adjustable.

In the above solution, two adjacent movable bodies can be locked or released through the locking unit. After the length of the chassis is adjusted, the two adjacent movable bodies can be locked through the locking unit such that relative positions of the two adjacent movable bodies are fixed; and when it is necessary to adjust the length of the chassis, two adjacent movable bodies can be released through the locking unit and by adjusting relative positions of the two adjacent movable bodies, adjustment for the length of the chassis can be realized.

In some embodiments, one movable body of the two adjacent movable bodies is provided with a first plugging portion, and the other movable body of the two adjacent movable bodies is provided with a second plugging portion;
- the first plugging portion is movably inserted into the second plugging portion along the first preset direction; and
- the locking unit is configured to lock or release the first plugging portion and the second plugging portion.

In the above solution, the first plugging portion of one of the two adjacent movable bodies is movably inserted into the second plugging portion of the other of the two adjacent movable bodies, such that the two adjacent movable bodies restrict each other and an entirety consisting of the two adjacent movable bodies is of favorable stability. Locking or releasing the first plugging portion and the second plugging portion through the locking unit can realize locking or releasing over the two adjacent movable bodies.

In some embodiments, each locking unit includes:
- a locking pin movably provided at the first plugging portion, where with a plurality of locking holes arranged at an interval on the second plugging portion along the first preset direction, the locking pin is configured to be selective inserted into one locking hole; and
- an elastic piece acting between the locking pin and the first plugging portion for providing an elastic force to the locking pin so as to enable the locking pin to be inserted into one locking hole aligned therewith.

In the above solution, the locking unit includes a locking pin and an elastic piece. Through the elastic piece, an elastic force is provided for the locking pin, enabling the locking pin to be inserted into the locking hole to realize locking of the first plugging portion and the second plugging portion. The locking unit of such a structure is simple in structure. The locking pin can lock the first plugging portion and the second plugging portion automatically in the relative moving process of the first plugging portion and the second plugging portion. Certainly, after the locking pin exits the locking hole under an external force, the locking pin will release the first plugging portion and the second plugging portion, in which case relative positions of the first plugging portion and the second plugging portion can be adjusted.

According to a second aspect, embodiments of the present application provide a vehicle, the vehicle including:
- a vehicle body, and
- the chassis described above, where the vehicle body is connected to the chassis.

In the above solution, the vehicle body in the vehicle is a telescopic structure that is adjustable in length, and the length of the chassis can be adjusted according to the requirements to enable the chassis to adapt to the vehicle body of a different length. Regarding requirements for a different driving scene of a user, the vehicle body of a different length can be replaced onto the chassis so as to satisfy driving requirements and improve user experience.

In some embodiments, the vehicle body is detachably connected to the chassis.

In the above solution, the vehicle body is detachably connected to the chassis, which facilitates replacement of the vehicle body.

In some embodiments, the vehicle further includes:
- a locking assembly, through which the vehicle body and the chassis are detachably connected.

In the above solution, the detachable connection of the vehicle body and the chassis is realized through the assembly and solidity of the vehicle body and the chassis after being connected is ensured.

In some embodiments, the locking assembly includes:
- a locking piece including a limiting portion and a rod portion connected to the limiting portion, where an inserting hole is provided on the rod portion, and the rod portion is configured to be penetrated into the vehicle body and the chassis; and a wedge block configured to compact the vehicle body and the chassis jointly together with the limiting portion upon being inserted into the inserting hole.

In the above solution, after the wedge block is inserted into the inserting hole of the locking piece, the wedge block and the limiting portion of the locking piece can jointly tighten the vehicle body and the chassis, thus locking the vehicle body and the chassis; and after the wedge block is pulled out from the inserting hole, the vehicle body can be dismounted from the chassis for replacement of the vehicle body. The locking assembly of such a structure can realize rapid dismounting of the vehicle body and the chassis.

According to a third aspect, embodiments of the present application provide a device for manufacturing a vehicle, where the device for manufacturing a vehicle includes:

a providing apparatus for providing a vehicle body and a chassis, where the chassis includes at least two movable bodies that are continuously arranged along a first preset direction, each movable body is provided at an adjacent movable body thereof with a position adjustable in the first preset direction, and by adjusting a position of at least one movable body in the first preset direction, a length of the chassis in the first preset direction can be changed so as to enable the chassis to adapt to the vehicle body of a different length; and a mounting apparatus for mounting the vehicle body onto the chassis.

According to a fourth aspect, embodiments of the present application provide a method for manufacturing a vehicle, where the method for manufacturing a vehicle includes:

adjusting a length of a chassis; and mounting a vehicle body onto the chassis with an adjusted length;

where the chassis includes at least two movable bodies that are continuously arranged along a first preset direction, each movable body is provided at an adjacent movable body thereof with a position adjustable in the first preset direction, and by adjusting a position of at least one movable body in the first preset direction, a length of the chassis in the first preset direction can be changed so as to enable the chassis to adapt to the vehicle body of a different length.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

Figure 1:
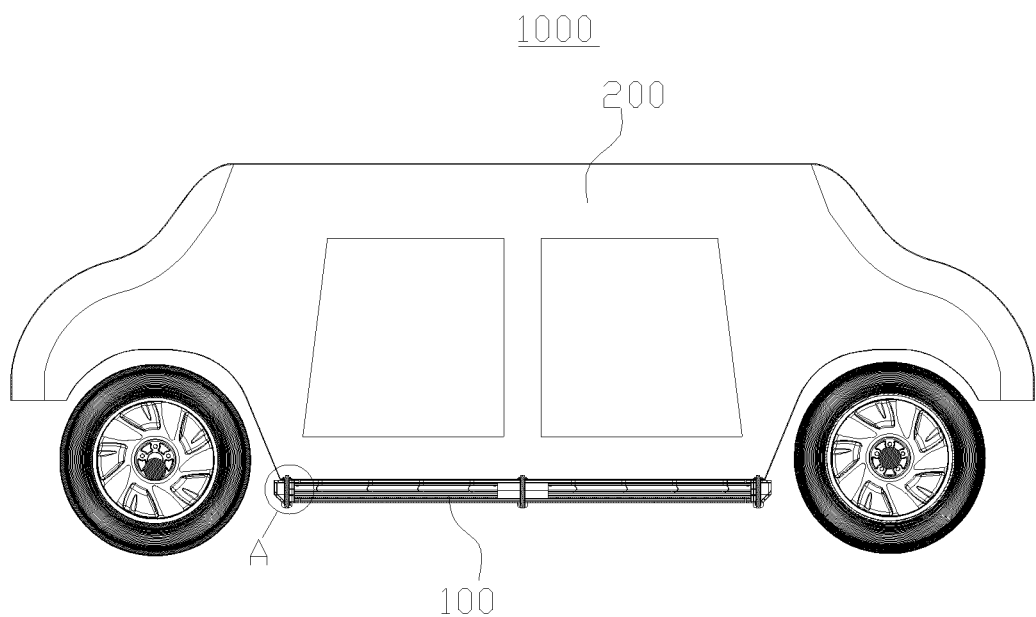
FIG. 1 is a structural diagram of a vehicle provided in some embodiments of the present application.

Of the accompanying drawings, the accompanying drawings are not drawn according to actual proportions.

Instructions to markers: 10—movable body; 101—first plugging portion; 1011—sliding hole; 102—second plugging portion; 1021—locking hole; 11—first movable body; 111—first connecting beam; 1111—first connecting portion; 1112—second connecting portion; 112—second connecting beam; 1121—third connecting portion; 1122—fourth connecting portion; 113—external cross beam; 12—second movable body; 13—third movable body; 131—first longitudinal beam; 132—second longitudinal beam; 133—first cross beam; 1331—telescopic unit; 1332—first sleeve; 1333—second sleeve; 1334—first connecting piece; 134—second cross beam; 1341—third sleeve; 1342—fourth sleeve; 1343—second connecting piece; 14—accommodating space; 141—accommodating grid; 15—top plate; 16—bottom plate; 17—support beam; 18—locking unit; 181—locking pin; 182—elastic piece; 183—bar piece; 20—front wheel; 30—rear wheel; 40—first suspension; 50—second suspension; 100—chassis; 200—vehicle body; 300—battery; 400—controller; 500—motor; 600—locking assembly; 610—locking piece; 611—limiting portion; 612—rod portion; 6121—inserting hole; 620—wedge block; 630—bushing; 700—locating structure; 710—rib; 720—locating slot; 1000—vehicle; 1100—providing apparatus; 1200—mounting apparatus; 2000—device for manufacturing a vehicle; X—first preset direction; and Y—second preset direction.

DETAILED DESCRIPTION OF EMBODIMENTS

The following further describes the implementations of the present application in detail with reference to the accompanying drawings and embodiments. Detailed description of the following embodiments and accompanying drawings are configured to illustratively state the principles of the present application, but not to limit the scope of the present application, that is, the present application is not limited to the embodiments described.

In the descriptions of the present application, it should be noted that unless otherwise described additionally, "plural" means more than two; and the orientations or positional relationships indicated by the terms "up", "down", "left", "right", "inside", "outside", and the like are merely intended to facilitate the descriptions of the present application and simplify the descriptions, but not intended to indicate or imply that the apparatuses or components mentioned must have specific orientations, or be constructed and operated for a specific orientation, and therefore shall not be understood as a limitation to the present application. In addition, the terms "first", "second" and "third" etc. are merely intended for a purpose of description, and shall not be understood as an indication or implication of relative importance. "Vertical" does not mean vertical in the strict sense, but to be vertical within a permitted range of an error. "Parallel" does not mean parallel in the strict sense, but to be parallel within a permitted range of an error.

The location words appearing in the following descriptions are all directions indicated in the drawings, but not to constitute any limitation to the specific structure of the present application. In the description of the present application, it should be further noted that unless otherwise prescribed and defined clearly, terms "mounting", "communicating" and "connection" should be understood in a broad sense, which for example can be a fixed connection and can also be a detachable connection or an integral connection; or can be a direct connection and can also be a connection through an intermediary. A person of ordinary skill in the art can understand specific meanings of these terms in the present application based on specific situations.

At present, the chassis of the vehicle is fixed and single and the chassis of a fixed-length only adapts to one particular vehicle body, resulting in single user experience and failure of satisfying using requirements of the user.

In view of this, the present application provides a technical solution in which the length of the chassis is made adjustable by setting the chassis as a telescopic structure that is telescopic along a length direction so as to enable the chassis to adapt to the vehicle body of a different length.

It should be noted that the technical solution described in embodiments of the present application is applicable to the vehicle and the vehicle can be a fuel-engined automobile, a fuel gas automobile or a new energy automobile, and the new energy automobile can be a pure electric automobile or a hybrid power automobile or an extended-range automobile etc. Embodiments of the present application do not make any special restriction to the above vehicle.

For convenient statement, the following embodiments make a description with an example of taking the new energy automobile as the vehicle.

Please referring to FIG. 1, FIG. 1 is a structural diagram of a vehicle 1000 provided in some embodiments of the present application, and the vehicle 1000 includes a chassis 100 and a vehicle body 200, where the vehicle body 200 is connected onto the chassis 100.

Figure 2:
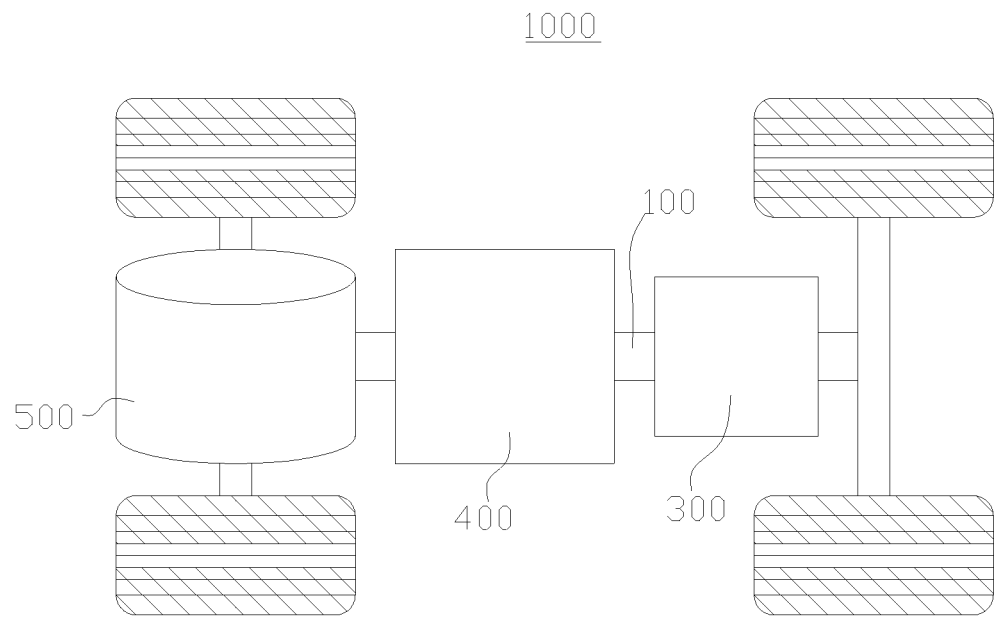
FIG. 2 is a simplified diagram of a vehicle provided in some embodiments of the present application.

Please referring to FIG. 2, FIG. 2 is a simplified diagram of a vehicle 1000 provided in some embodiments of the present application, the vehicle 1000 further including a battery 300, where the battery 300 can be provided at a bottom or a head or a tail of the vehicle 1000. The battery 300 can be configured to power the vehicle 1000. For example, the battery 300 can serve as an operating power supply of the vehicle 1000.

Illustratively, the battery 300 is mounted onto the chassis 100 and the battery 300 can be suspended to a bottom of the chassis 100 and can also be integrated inside the chassis 100.

The vehicle 1000 further includes a controller 400 and a motor 500, where the controller 400 is configured to control the battery 300 to power the motor 500, for example, for working power requirements for starting, navigating and driving of the vehicle 1000.

Illustratively, the controller 400 and the motor 500 are both mounted on the chassis 100.

In some embodiments of the present application, the battery 300 cannot only serve as an operating power supply of the vehicle 1000, but also serve as a driving power supply of the vehicle 1000, thereby replacing or partially replacing fuel oil or natural gas to provide a driving power for the vehicle 1000.

The battery 300 provided in embodiments of the present application refers to a single physical module including one or more battery cells to provide higher voltage and capacity. For example, the battery 300 mentioned in the present application can include a battery module or a battery pack etc. The battery 300 generally includes a cabinet for packaging one or more battery cells, and the cabinet can prevent liquid or other foreign material affecting charging or discharging of the battery cell.

In the present application, the battery cell can include a lithium-ion secondary battery, a lithium-ion primary battery, a lithium-sulfur battery, a sodium-lithium-ion battery, a sodium-ion battery or a magnesium-ion battery etc., which are not limited by embodiments of the present application. The battery cell can be of such shapes as a cylinder, a flat body, a cuboid or other shapes, which are also not limited by embodiments of the present application. The battery cell is generally divided into three types according to a packaging manner: a column-shaped battery cell, a rectangle-shaped battery cell and a soft-package battery cell, which are also not limited by embodiments of the present application.

The battery cell includes an electrode assembly and an electrolytic solution, the electrode assembly being composed of an anode piece, a cathode piece and an isolating film. The battery cell mainly works by depending on movement of a metal ion between the anode piece and the cathode piece. The anode piece includes an anode set fluid and an anode active substance layer, the anode active substance layer being coated on a surface of the anode set fluid. The set fluid without being coated with the anode active substance layer protrudes outside the set fluid coated with the anode active substance layer and the set fluid without being coated with the anode active substance layer is a plus lead. With the lithium-ion battery as an example, the material of the anode set fluid can be aluminum and the anode active substance can be lithium cobalt oxide, lithium iron phosphate, ternary lithium or lithium manganese oxide etc. The cathode piece includes a cathode set fluid and a cathode active substance layer, the cathode active substance layer being coated on a surface of the cathode set fluid. The set fluid without being coated with the cathode active substance layer protrudes outside the set fluid coated with the cathode active substance layer and the set fluid without being coated with the cathode active substance layer is a minus lead. The material of the cathode set fluid can be copper and the cathode active substance can be carbon or silicon etc. In order to ensure pass of big current without occurrence of fusing, there are multiple plus leads, which are stacked together, and there are multiple minus leads, which are stacked together. The material of the isolating film can be PP or PE etc. In addition, the electrode assembly can be of a winding-type structure and can also be of a stack-type structure, which are not limited by embodiments of the present application.

Figure 3:
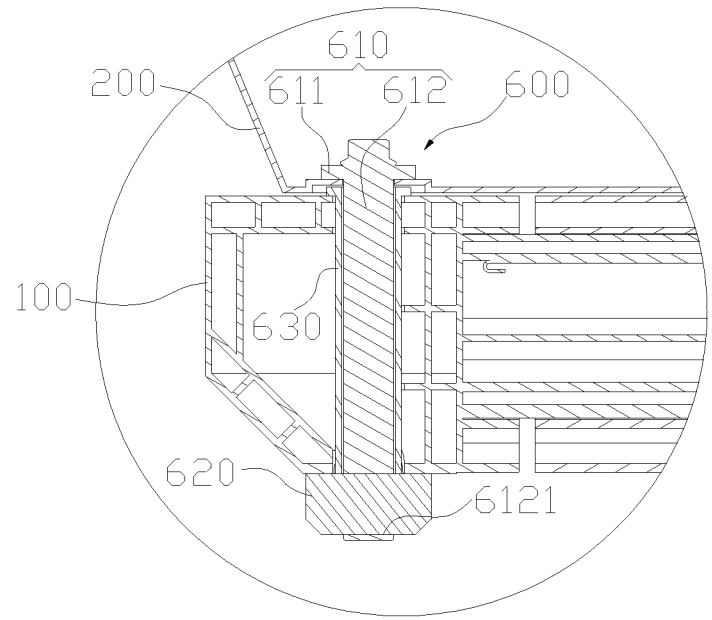
FIG. 3 is a locally enlarged view of point A of a vehicle shown in FIG. 1.

In some embodiments, please referring to FIG. 3, FIG. 3 is a locally enlarged view of point A of a vehicle 1000 shown in FIG. 1, where the vehicle body 200 is detachably connected to the chassis 100, which facilitates replacement of the vehicle body 200.

The vehicle body 200 and the chassis 100 can be detachably connected through various manners. For example, the vehicle body 200 and the chassis 100 can be detachably connected through a clamping manner. For example, again, the vehicle body 200 and the chassis 100 can be detachably connected through the locking assembly 600.

In some embodiments, the vehicle 1000 further includes a locking assembly 600, through which the vehicle body 200 and the chassis 100 are detachably connected to ensure solidity of the vehicle body 200 and the chassis 100 after being connected.

Optionally, the locking assembly 600 includes a locking piece 610 and a wedge block 620. The locking piece 610 includes a limiting portion 611 and a rod portion 612 connected to the limiting portion 611, where an inserting hole 6121 is provided on the rod portion 612. The rod portion 612 is inserted in the vehicle body 200 and the chassis 100, the wedge block 620 is inserted in the inserting hole 6121 and the wedge block 620 and the limiting portion 611 jointly tighten the vehicle body 200 and the chassis 100.

After the wedge block 620 is pulled out from the inserting hole 6121, the locking piece 610 can be pulled out from the vehicle body 200 and the chassis 100 so as to dismount the vehicle body 200 from the chassis 100 for replacement of the vehicle body 200. The locking assembly 600 of the above structure can realize rapid dismounting of the vehicle body 200 and the chassis 100.

Illustratively, the rod 612 is a column-shaped rod, the limiting portion 611 is an annular protrusion circumferentially provided on an external circumferential wall of the rod 612, the limiting portion 611 is close to one axial end of the rod 612 and the inserting hole 6121 is close to the other axial end of the rod 612.

It should be noted that when the wedge block 620 and the limiting portion 611 of the locking piece 610 tighten the vehicle body 200 and the chassis 100, the wedge block 620 can be squeezed to the chassis 100, and the limiting portion 611 is squeezed to the vehicle body 200, as shown in FIG. 3; or the wedge block 620 is squeezed to the vehicle body 200 and the limiting portion 611 is squeezed to the chassis 100.

Illustratively, a bushing 630 provided for the rod portion 612 of the locking piece 610 to penetrate inside is provided on the chassis 100. When the locking assembly 600 locks the chassis 100 and the vehicle body 200, the rod portion 612 of the locking piece 610 penetrates in the bushing 630.

Certainly, the locking assembly 600 can further be of other structures. For example, the locking assembly 600 includes a bolt and a nut, where the bolt simultaneously penetrates into the vehicle body 200 and the chassis 100, and with thread-connection cooperation of the nut and the bolt, the head of the bolt and the nut jointly tighten the vehicle body 200 and the chassis 100.

Figure 4:
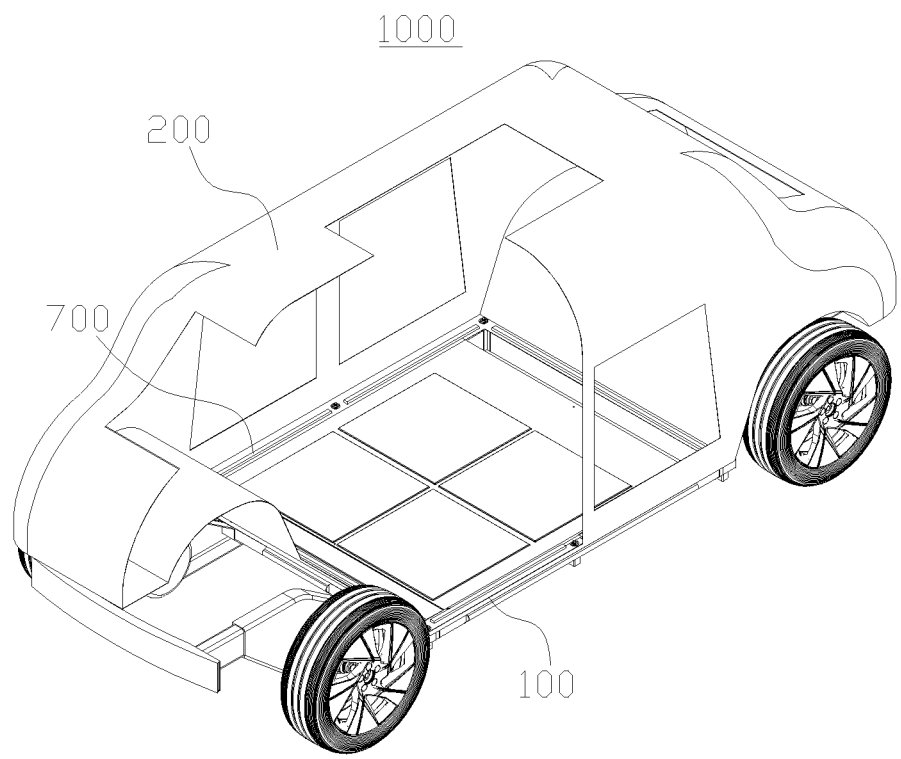
FIG. 4 is an axonometric drawing of a vehicle provided in some embodiments of the present application.

In some embodiments, please referring to FIG. 4, FIG. 4 is an axonometric drawing of a vehicle 1000 provided in embodiments of the present application, where a locating structure 700 is provided between the chassis 100 and the vehicle body 200 to realize rapid locating between the vehicle body 200 and the chassis 100.

Figure 5:
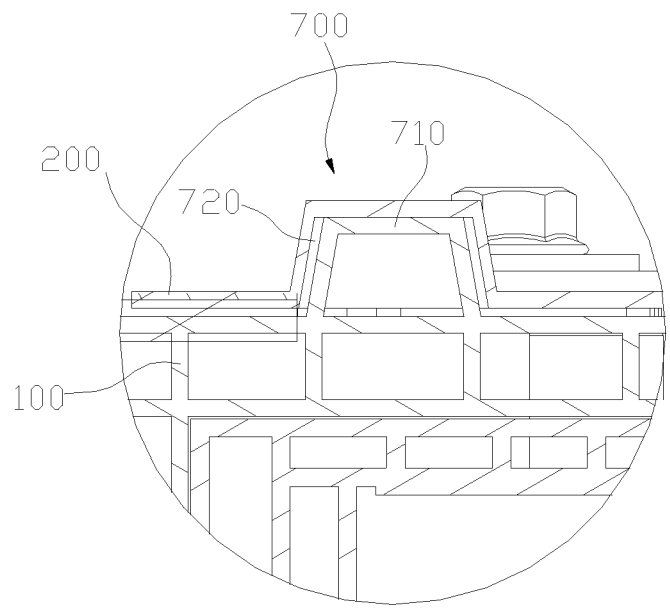
FIG. 5 is a locally enlarged view of a connecting position of a chassis and a vehicle body of a vehicle shown in FIG. 4.

Please referring to FIG. 5, FIG. 5 is a locally enlarged view of a connecting position of a chassis 100 and a vehicle body 200 of a vehicle 1000 shown in FIG. 4. The locating structure 700 includes a rib 710 and a locating slot 720, the rib 710 is provided on one of the vehicle body 200 and the chassis 100, the locating slot 720 is provided on the other of the vehicle body 200 and the chassis 100, and the rib 710 is clamped in the locating slot 720 to realize locating of the vehicle body 200 and the chassis 100. In FIG. 5, the rib 710 is provided at the chassis 100 and the locating slot 720 is provided at the vehicle body 200.

Upon mounting the vehicle body 200, the rib 710 on the chassis 100 can be firstly clamped in the locating slot 720 on the vehicle body 200, thereby realizing locating of the vehicle body 200 and the chassis 100, and then the chassis 100 and the vehicle body 200 are locked for fixing through the locking assembly 600.

Figure 6:
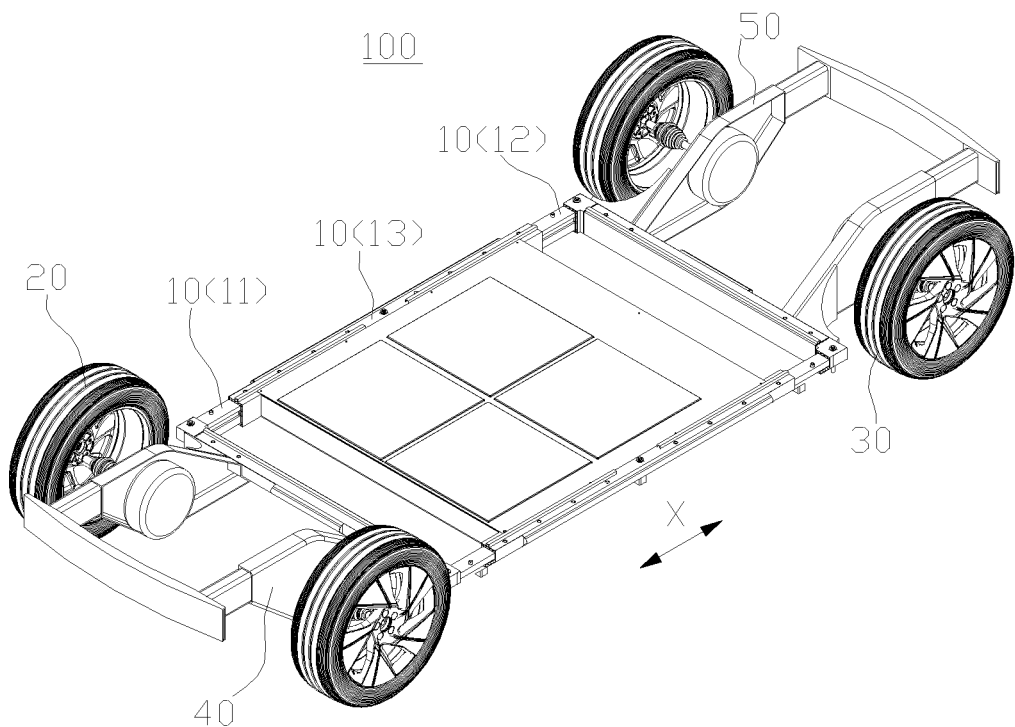
FIG. 6 is a structural diagram of a chassis of a vehicle shown in FIG. 1.

Please referring to FIG. 6, FIG. 6 is a structural diagram of a chassis 100 of a vehicle 1000 shown in FIG. 1. The chassis 100 provided in embodiments of the present application includes at least two movable bodies 10 that are continuously arranged along a first preset direction X, each movable body 10 is provided at an adjacent movable body 10 thereof with a position adjustable in the first preset direction X, and by adjusting a position of at least one movable body 10 in the first preset direction X, a length of the chassis 100 in the first preset direction X can be changed so as to enable the chassis 100 to adapt to the vehicle body 200 of a different length.

Since each movable body 10 is provided at an adjacent movable body 10 thereof with a position adjustable in a preset direction, the chassis 100 is made into a telescopic structure that is adjustable in length, and the length of the chassis 100 can be adjusted according to the requirements to enable the chassis 100 to adapt to the vehicle body 200 of a different length. Regarding requirements for a different driving scene of a user, the vehicle body 200 of a different length can be replaced onto the chassis 100 so as to satisfy driving requirements and improve user experience. For example, according to the requirements for a different driving scene, after the length of the chassis 100 is adjusted, the vehicle body 200 of a sedan (class A vehicle, class B vehicle and class C vehicle etc.), a SUV, a van and other vehicle models can be mounted on the chassis 100.

It should be noted that every two adjacent movable bodies 10 in the chassis 100 are relatively movable. When the length of the chassis 100 is changed by changing relative positions of two adjacent movable bodies 10, one movable body 10 can be still and a position of the other movable body 10 can be adjusted to lengthen or shorten the chassis 100. Certainly, positions of the two adjacent movable bodies 10 can also be adjusted simultaneously to length or shorten the chassis 100.

The first preset direction X can be a length direction of the vehicle 1000 and can also be a width direction of the vehicle 1000. The following embodiments use an example of taking the first preset direction X as the length direction of the vehicle 1000.

The movable bodies 10 in the chassis 100 can be two, three, four, five, and the like, as the number of the movable bodies 10 can be set according to requirements.

The chassis 100 can further includes a front wheel 20 and a rear wheel 30. The front wheel 20 and the rear wheel 30 are arranged front and rear in the first preset direction X. The front wheel 30 and the rear wheel 30 can be mounted on one same movable body 10 and the front wheel 20 and the rear wheel 30 can also be respectively mounted on two movable bodies 10. If the front wheel 20 and the rear wheel 30 are arranged on one same movable body 10, the wheel base of the chassis 100 will not change in the process of adjusting the length of the chassis 100. If the front wheel 20 and the rear wheel 30 are respectively mounted to two movable bodies 10, the wheel base of the chassis is simultaneously adjusted when the length of the chassis 100 is adjusted.

It should be noted that the wheel base of the chassis 100 is a distance between a central axis of the front wheel 20 and a central axis of the rear wheel 30 in the first preset direction X.

In some embodiments, the at least two movable bodies 10 includes a first movable body 11 and a second movable body 12, that is, the two movable bodies 10 in the chassis 100 are respectively the first movable body 11 and the second movable body 12. Where the first movable body 11 is configured to mount the front wheel 20, and the second movable body 12 is configured to mount the rear wheel 30, that is, the front wheel 20 and the rear wheel 30 are respectively mounted to the two movable bodies 10.

By changing positions of the first movable body 11 and the second movable body 12 to change the length of the chassis 100, adjustment for a wheel base of the chassis 100 can be realized. When the length of the chassis 100 increases by changing positions of the first movable body 11 and the second movable body 12, the wheel base of the chassis 100 increases; and when the length of the chassis 100 decreases by changing positions of the first movable body 11 and the second movable body 12, the wheel base of the chassis 100 decreases.

The first movable body 11 and the second movable body 12 can be two adjacent movable bodies 10 and can also be two non-adjacent movable bodies 10.

In some embodiments, the at least two movable bodies 10 further includes a third movable body 13, where the first movable body 11, the third movable body 13 and the second movable body 12 are arranged in order in the first preset direction X. It can be understood that the first movable body 11 is connected to the second movable body 12 through the third movable body 13. The first movable body 11 and the second movable body 12 are two non-adjacent movable bodies 10, and the first movable body 11, the third movable body 12 and the second movable body 12 are three adjacent movable bodies 10.

Upon adjusting the length of the vehicle body 200, the third movable body 13 can be still and the length of the vehicle body 200 can be changed by adjusting positions of the first movable body 11 and/or the second movable body 12.

Illustratively, a first suspension 40 is provided on the first movable body 11, where the first suspension 40 is configured to mount the front wheel 20; and a second suspension 50 is provided on the second movable body 12, where the second suspension 50 is configured to mount the front wheel 20.

In some embodiments, at least one movable body 10 of the at least two movable bodies 10 is provided with an accommodating space 14 (not shown in FIG. 6) for accommodating a battery cell, that is, at least one movable body 10 in the chassis 100 is provided with an accommodating space 14.

The accommodating space 14 can accommodate the battery cell. By fully using the internal space of the movable body 10 where the accommodating space 14 is provided, integration and integrity of the battery cell and the chassis 100 can be realized, which can efficiently increase a ground clearance of the battery cell. Therefore, it is not easy to damage the battery cell.

It should be noted that one or more battery cells can be accommodated in the accommodating space 14. The battery cell can be directly placed in the accommodating space 14, the movable body 10 provided with the accommodating space 14 forms a cabinet structure that accommodates the battery cell, and the entirety consisting of the movable body 10 provided with the accommodating space 14 and the battery cell serves as the battery 300 of the vehicle 1000. Certainly, the battery 300 is placed in the accommodating space 14 after being formed with the battery cell and the separate cabinet.

The first movable body 11, the second movable body 12 and the third movable body 13 can all be provided in the accommodating space 14, or one or two of the first movable body 11, the second movable body 12 and the third movable body 13 can be provided in the accommodating space 14.

The accommodating space 14 can be a structure with an upper end open, or a structure with a lower end open or a structure with both an upper end and a lower end open.

Figure 7:
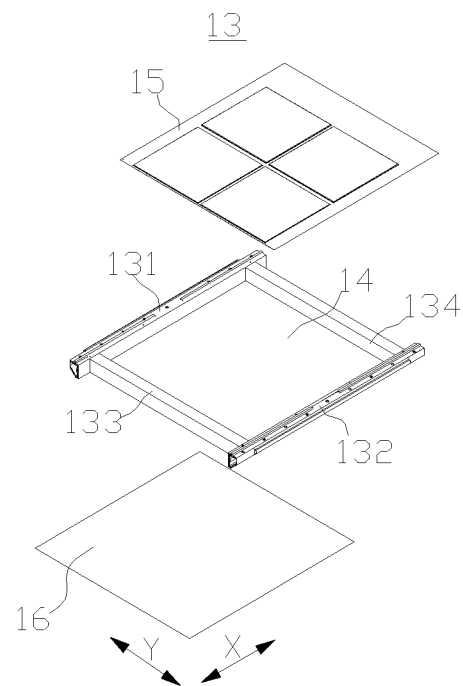
FIG. 7 is a structural diagram of a third movable body of a chassis shown in FIG. 6.

In some embodiments, please referring to FIG. 7, FIG. 7 is a structural diagram of a third movable body 13 of a chassis 100 shown in FIG. 6, where an accommodating space 14 for accommodating a battery cell is provided on the third movable body 13.

Providing an accommodating space 14 for accommodating a battery cell on the third movable body 13 results in a compact structure and a reasonable layout, such that after the battery cell is placed in the third movable body 13, the center of gravity for the chassis 100 does not lean forward or backward excessively.

Optionally, the third movable body 13 includes a first longitudinal beam 131, a second longitudinal beam 132, a first cross beam 133 and a second cross beam 134, where the first longitudinal beam 131 and the second longitudinal beam 132 are arranged along the first preset direction X, and the first cross beam 133 and the second cross beam 134 are arranged along the second preset direction Y. It can be understood that the first preset direction X is perpendicular to the second preset direction Y.

Where, the first longitudinal beam 131, the second longitudinal beam 132, the first cross beam 133 and the second cross beam 134 jointly define an accommodating space 14. Such a third movable body 13 is simple in structure and has a very favorable structural stability.

It can be understood that the accommodating space 14 is a structure with upper and lower ends open.

Optionally, the third movable body 13 further includes a top plate 15 and a bottom plate 16, where both the top plate 15 and the bottom plate 16 can be detachably connected to a frame structure consisting of the first longitudinal beam 131, the second longitudinal beam 132, the first cross beam 133 and the second cross beam 134. The top plate 15 and the bottom plate 16 can be detachably connected to the frame structure through a bolt, a screw and other connectors.

The top plate 15 and the bottom plate 16 can be respectively blocked to upper and lower ends of the accommodating space 14, enabling the top plate 15, the bottom plate 16, the first longitudinal beam 131, the second longitudinal beam 132, and the first cross beam 133 to form a sealing space for accommodating the battery cell so as to provide a sealing environment for the battery cell.

The first cross beam 133 and the second cross beam 134 can be a telescopic structure and can also be a non-telescopic structure. The first cross beam 133 can be fixedly connected to the first longitudinal beam 131 and the second longitudinal beam 132. For example, two ends of the first cross beam 133 in the second preset direction Y can be respectively welded to the first longitudinal beam 131 and the second longitudinal beam 132. The first cross beam 133 can be movably connected to the first longitudinal beam 131 and the second longitudinal beam 132. For example, the first cross beam 133 is provided at the first longitudinal beam 131 and the second longitudinal beam 132 with a position adjustable along the first preset direction X. The second cross beam 134 can be fixedly connected to the first longitudinal beam 131 and the second longitudinal beam 132. For example, two ends of the first cross beam 134 in the second preset direction Y can be respectively welded to the first longitudinal beam 131 and the second longitudinal beam 132. The second cross beam 134 can be movably connected to the first longitudinal beam 131 and the second longitudinal beam 132. For example, the second cross beam 134 is provided at the first longitudinal beam 131 and the second longitudinal beam 132 with a position adjustable along the first preset direction X. The third movable body 13 of different structural forms are described in details in combination with the following accompanying drawings.

Figure 8:
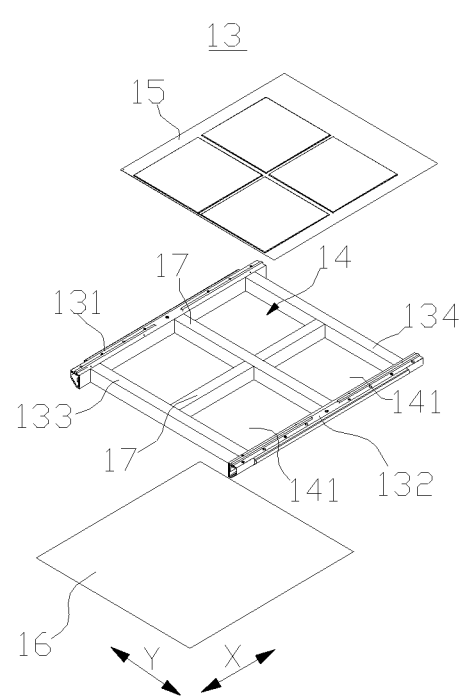
FIG. 8 is a structural diagram of a third movable body provided in some embodiments of the present application.

In some embodiments, please referring to FIG. 8, FIG. 8 is a structural diagram of a third movable body 13 provided in some embodiments of the present application, where the third movable body 13 further includes a support beam 17. At least one support beam 17 is connected between the first longitudinal beam 131 and the second longitudinal beam 132 and between the first cross beam 133 and the second cross beam 134 to split the accommodating space 14 into a plurality of accommodating grids 141 for accommodating the battery cell.

The support beam 17 can perform a good enforcing function for a frame structure enclosed by the first longitudinal beam 131, the second longitudinal beam 132, the first cross beam 133 and the second cross beam 134, thereby improving strength and rigidity of the third movable body 13.

In the embodiments, the first cross beam 133 and the second cross beam 134 are non-telescopic structures, two ends of the first cross beam 133 are fixedly connected to the first longitudinal beam 131 and the second longitudinal beam 132 respectively, and two ends of the second cross beam 134 are fixedly connected to the first longitudinal beam 131 and the second longitudinal beam 132 respectively.

In other embodiments, at least one support beam 17 is connected between the first longitudinal beam 131 and the second longitudinal beam 132 only to split the accommodating space 14 into a plurality of accommodating grids 141 for accommodating the battery cell or at least one support beam 17 is connected between the first longitudinal beam 131 and the second longitudinal beam 132 only to split the accommodating space 14 into a plurality of accommodating grids 141 for accommodating the battery cell.

Figure 9:
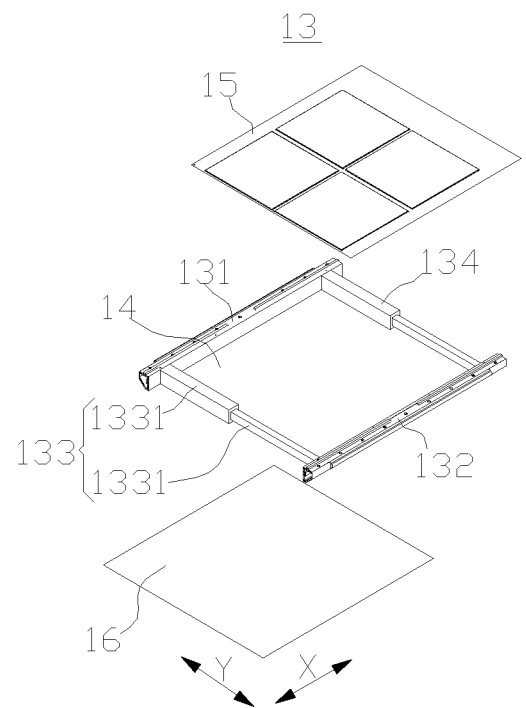
FIG. 9 is a structural diagram of a third movable body provided in some further embodiments of the present application.

In some embodiments, please referring to FIG. 9, FIG. 9 is a structural diagram of a third movable body 13 provided in some further embodiments of the present application, where the first cross beam 133 is a telescopic structure that is telescopic along the second preset direction Y, and the second cross beam 134 is a telescopic structure that is telescopic along the second preset direction Y.

Since the first cross beam 133 and the second cross beam 134 are both telescopic structures that are telescopic along the second preset direction Y, through stretch of the first cross beam 133 and the second cross beam 134, a distance between the first longitudinal beam 131 and the second longitudinal beam 132 can be changed, thus realizing that a width of the third movable body 13 is adjustable in the second preset direction Y.

The first cross beam 133 and the second cross beam 134 can both includes a plurality of telescopic unit 1331. Illustratively, as shown in FIG. 9, the first cross beam 133 and the second cross beam 134 can both include two telescopic unit 1331.

Figure 10:
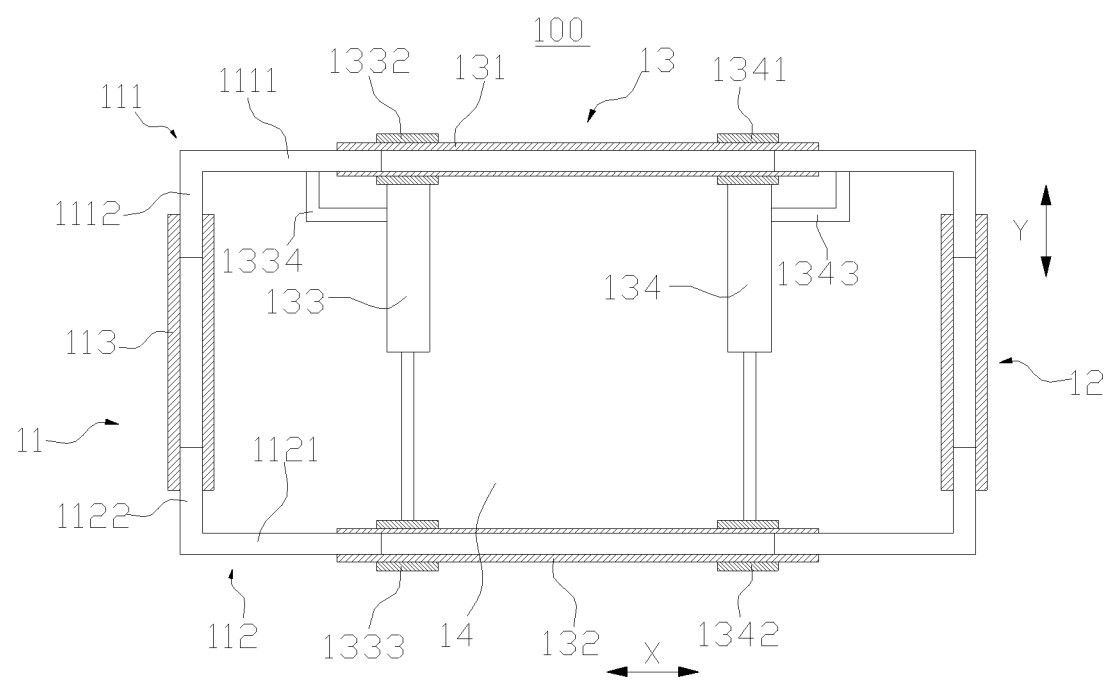
FIG. 10 is a structural diagram of a chassis provided in some embodiments of the present application.

In some embodiments, please referring to FIG. 10, FIG. 10 is a structural diagram of a chassis 100 provided in some embodiments of the present application. The first cross beam 133 is provided at the first longitudinal beam 131 and the second longitudinal beam 132 with a position adjustable along the first preset direction X, the first cross beam 133 is connected to the first movable body 11, and by adjusting the position of the first movable body 11, the position of the first cross beam 133 can be changed to adjust a size of the accommodating space 14. The second cross beam 134 is provided at the first longitudinal beam 131 and the second longitudinal beam 132 with a position adjustable along the first preset direction X, the second cross beam 134 is connected to the second movable body 12, and by adjusting a position of the second movable body 12, a position of the second cross beam 134 can be changed to adjust a size of the accommodating space 14.

By adjusting the position of the first movable body 11, the position of the first cross beam 133 can be changed, thus achieving the purpose of adjusting a size of the accommodating space 14. When the length of the chassis increases 100 by adjusting the position of the first movable body 11, the first cross beam 133 will move following the first movable body 11, such that the accommodating space 14 enclosed by the first longitudinal beam 131, the second longitudinal beam 132, the first cross beam 133 and the second cross beam 134 increases. Therefore, more battery cells can be accommodated in the accommodating space 14. Similarly, by adjusting the position of the second movable body 12, the position of the second cross beam 134 can be changed, thus achieving the purpose of adjusting a size of the accommodating space 14 as well.

Illustratively, a first sleeve 1332 and a second sleeve 1333 are respectively provided at two ends of the first cross beam 133 in the second preset direction Y, the first sleeve 1332 is sheathed to the first longitudinal beam 131, and the second sleeve 1333 is sheathed to the second longitudinal beam 132 to realize that the position of the first cross beam 133 is adjustable in the first preset direction X. A third sleeve 1341 and a fourth sleeve 1342 are respectively provided at two ends of the second cross beam 134 in the second preset direction Y, the third sleeve 1341 is sheathed to the first longitudinal beam 131, and the fourth sleeve 1342 is sheathed to the second longitudinal beam 132 to realize that the position of the second cross beam 134 is adjustable in the first preset direction X.

Where, the first cross beam 133 is connected to the first movable body 11 through the first connecting piece 1334, and the second cross beam 134 can be connected to the second movable body 12 through the second connecting piece 1343. Illustratively, the first connecting piece 1334 and the second connecting piece 1343 are of an L-shaped structure.

In the embodiments, the first cross beam 133 can be a telescopic structure and can also be a non-telescopic structure; and the second cross beam 134 can be a telescopic structure and can also be a non-telescopic structure. FIG. 10 shows a case in which a first cross beam 133 and a second cross beam 134 are both telescopic structures.

It should be noted that in other embodiments, only one of the first cross beam 133 and the second cross beam 134 is provided at the first longitudinal beam 131 and the second longitudinal beam 132 with a position adjustable along the first preset direction X, so as to adjust a size of the accommodating space 14.

Figure 11:
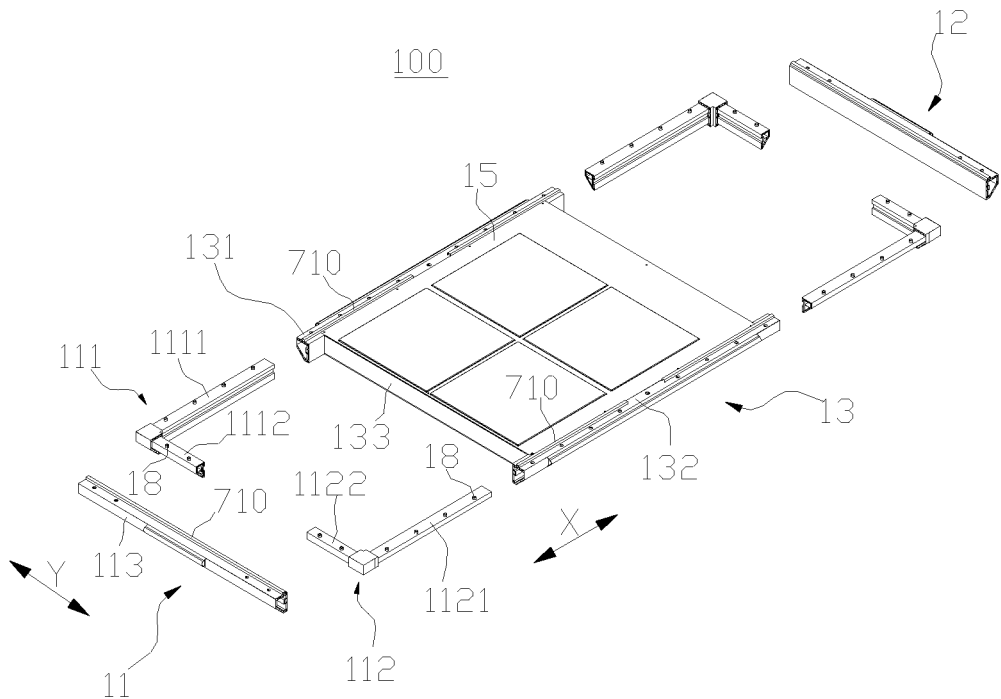
FIG. 11 is an exploded view of a chassis shown FIG. 6.

In some embodiments, please referring to FIG. 11, FIG. 11 is an exploded view of a chassis 100 shown FIG. 6. The first movable body 11 includes a first connecting beam 111, a second connecting beam 112 and an external cross beam 113. The first connecting beam 111 is provided at the first longitudinal beam 131 with a position adjustable in the first preset direction X. The second connecting beam 112 is provided at the second longitudinal beam 132 with a position adjustable in the first preset direction X. The first connecting beam 111 and the second connecting beam 112 of the external cross beam 113 are connected through the external cross beam 113.

In the above structure, the first connecting beam 111 and the second connecting beam 112 of the first movable body 11 are connected through the external cross beam 113. Such a structure enables the first movable body 11 to have a favorable integrity. The first connecting beam 111 and the second connecting beam 112 are adjustably provided at the first longitudinal beam 131 and the second longitudinal beam 132 respectively in the first preset direction X and by adjusting positions of the first connecting beam 111 and the second connecting beam 112, stable adjustment for the position of the first movable body 11 can be realized.

Optionally, the first connecting beam 111 is provided at one end of the external cross beam 113 with a position adjustable in a second preset direction Y and the second connecting beam 112 is provided at another end of the external cross beam 113 with a position adjustable in the second preset direction Y.

In the above structure, the first connecting beam 111 and the second connecting beam 112 are respectively provided at two ends of the external cross beam 113 with positions adjustable in the second preset direction Y and by adjusting positions of the first connecting beam 111 and the second connecting beam 112, a distance between the first connecting beam 111 and the second connecting beam 112 in the second preset direction Y can be changed, such that a width of the first movable body 11 is adjustable in the second preset direction Y. The user can adjust the width of the first movable body 11 in the second preset direction according to the requirements.

Optionally, the first connecting beam 111 includes a first connecting portion 1111 and a second connecting portion 1112 connected to the first connecting portion 1111. The second connecting beam 112 includes a third connecting portion 1121 and a fourth connecting portion 1122 connected to the third connecting portion 1121. The first connecting portion 1111 and the third connecting portion 1121 are respectively configured for plug-cooperation to the first longitudinal beam 131 and the second longitudinal beam 132 in the first preset direction X. The second connecting portion 1112 and the fourth connecting portion 1122 are respectively configured for plug-cooperation to two ends of the external cross beam 113 in the second preset direction Y.

By respective plug-cooperation of the first connecting portion 1111 of the first connecting beam 111 and the third connecting portion 1121 of the second connecting beam 112 to the first longitudinal beam 131 and the second longitudinal beam 132, it can be realized that the position of the first movable body 11 is adjustable in a simple manner, such that rapid dismounting and mounting of the first movable body 11 and the third movable body 13 can be realized conveniently. In the process of adjusting the position of the first movable body 11, the first connecting portion 1111 will move relative to the first longitudinal beam 131, the third connecting portion 1121 will move relative to the second longitudinal beam 132 and the first longitudinal beam 131 and the second longitudinal beam 132 perform a good directing function respectively for the first connecting portion 1111 and the third connecting portion 1121, thereby enabling stability of the first movable body 11 relative to the moving process of the third movable body 13.

By respective plug-cooperation of the second connecting portion 1112 of the first connecting beam 111 and the fourth connecting portion 1122 of the second connecting beam 112 to two ends of the external cross beam 113, it can be realized that positions of the first connecting beam 111 and the second connecting beam 112 are adjustable in a simple manner, such that rapid dismounting and mounting of the first connecting beam 111, the second connecting beam 112 and the external cross beam 113 can be realized conveniently. In the process of adjusting positions of the first connecting beam 111 and the second connecting beam 112, the second connecting portion 1112 of the first connecting beam 111 and the fourth connecting portion 1122 of the second connecting beam 112 will move relative to the external cross beam 113, and the external cross beam 113 performs a good directing function for the first connecting beam 111 and the second connecting beam 112, thereby enabling stability of the first connecting beam 111 and the second connecting beam 112 relative to the moving process of the external cross beam 113.

Illustratively, the first connecting portion 1111 and the second connecting portion 1112 are connected to form an L-shaped structure, the third connecting portion 1121 and the fourth connecting portion 1122 are connected to form an L-shaped structure, and the first movable body 11 is of a U-shaped structure as an entirety. The first longitudinal beam 131, the second longitudinal beam 132 and the external cross beam 113 are all hollow tubular structures. The first connecting portion 1111 and the third connecting portion 1121 are respectively configured for plug-cooperation to the first longitudinal beam 131 and the second longitudinal beam 132 in the first preset direction X. The second connecting portion 1112 and the fourth connecting portion 1122 are respectively configured for plug-cooperation to two ends of the external cross beam 113 in the second preset direction Y.

In the embodiments, the rib 710 for locating cooperation with the vehicle body 200 on the chassis 100 can be provided on the first longitudinal beam 131, the second longitudinal beam 132 and the external cross beam 113.

It can be known from the above contents that the first movable body 11 is a structure that is adjustable in width in a second preset direction Y. In this case, the first cross beam 133 and the second cross beam 134 of the third movable body 13 can be a telescopic structure and can also be a non-telescopic structure. If the first cross beam 133 and the second cross beam 134 of the third movable body 13 are all telescopic structures, upon adjusting the width of the second movable body 12 in the second preset direction Y, the first movable body 11 and the third movable body 13 can be made spaced apart firstly, and then relative positions of the first connecting beam 111 and the second connecting beam 112 are then adjusted. After the adjustment is completed, the third movable body 13 that is adaptive to the first movable body 11 is then replaced. If the first cross beam 133 and the second cross beam 134 of the third movable body 13 are all telescopic structures, as shown in FIG. 10, upon adjusting the width of the second movable body 12 in the second preset direction Y, the length of the first cross beam 133 and the second cross beam 134 in the first preset direction X can be adjusted simultaneously so as to enable the first longitudinal beam 131 and the second longitudinal beam 132 to adapt to a change in positions of the first connecting beam 111 and the second connecting beam 112 in the second preset direction Y. In the process, it is not necessary to space the first movable body 11 apart from the third movable body 13.

In the embodiments, the structure of the second movable body 12 can be the same as the structure of the first movable body 11, the manner of connecting the second movable body 12 and the third movable body 13 can also be the same as the manner of connecting the first movable body 11 and the third movable body 13, which are not described any longer herein.

Figure 12:
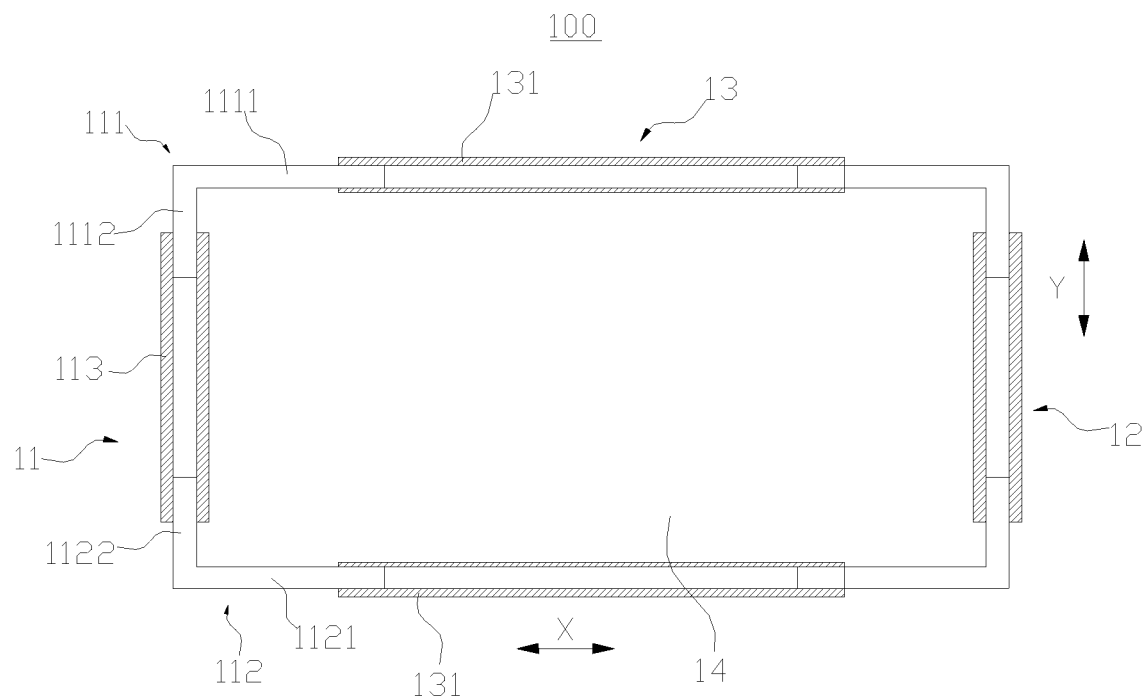
FIG. 12 is a structural diagram of a chassis provided in some further embodiments of the present application.

In the above embodiments, the accommodating space 14 is separately provided on the movable body 10 of the chassis 100. In some embodiments, the accommodating space 14 can also be enclosed jointly by the plurality of movable bodies 10. With a example of the chassis 100 including a first movable body 11, a third movable body 13 and a second movable body 12 that are arranged in order along a first preset direction X, please referring to FIG. 12, FIG. 12 is a structural diagram of a chassis 100 provided in some further embodiments of the present application. The first movable body 11, the third movable body 13 and the second movable body 12 define an accommodating space 14 for accommodating a battery cell. Upon adjusting positions of the first movable body 11 and the second movable body 12, the size of the accommodating pace 14 can change accordingly. When the length of the chassis 100 increases by adjusting the position of the first movable body 11, the accommodating space 14 increases. Therefore, more battery cells can be accommodated in the accommodating space 14. When the length of the chassis 100 increases by adjusting the position of the second movable body 12, the accommodating space 14 increases. Therefore, more battery cells can be accommodated in the accommodating space 14.

Optionally, the third movable body 13 includes a first longitudinal beam 131 and a second longitudinal beam 132 arranged along the first preset direction X, and the first longitudinal beam 131, the second longitudinal beam 132, the first movable body 11 and the second movable body 12 jointly define the accommodating space 14. Such a structure simplifies the structure of the third movable body 13 while ensuring favorable bearing ability for the third movable body 13, in which case the chassis 100 can be made lightweight.

Where, the first movable body 11 and the second movable body 12 can be of a U-shaped structure and can be a U-shaped structure with a width non-adjustable in a second preset direction Y. Certainly, the first movable body 11 and the second movable body 12 can also be of a U-shaped structure with a width adjustable in the second preset direction Y, for example, the structure of the first movable body 11 and the second movable body 12 shown in FIG. 11.

In embodiments of the present application, the chassis 100 can be a telescopic structure that is adjustable in length. After the length of the chassis 100 is adjusted, locking may not be performed between every two adjacent movable bodies 10, in which case after each movable body 10 of the vehicle body 200 is stabilized on the chassis 100, due to invariable length of the vehicle body 200, the length of the chassis 100 does not change as well, that is, every two adjacent movable bodies 10 in the chassis 100 can be fixed through the vehicle body 200. Certainly, after the length of the chassis 100 is adjusted, every two adjacent movable bodies 10 can also be locked firstly to maintain the chassis 100 at a particular length and then mount the vehicle body 200 onto the chassis 100.

Figure 13:
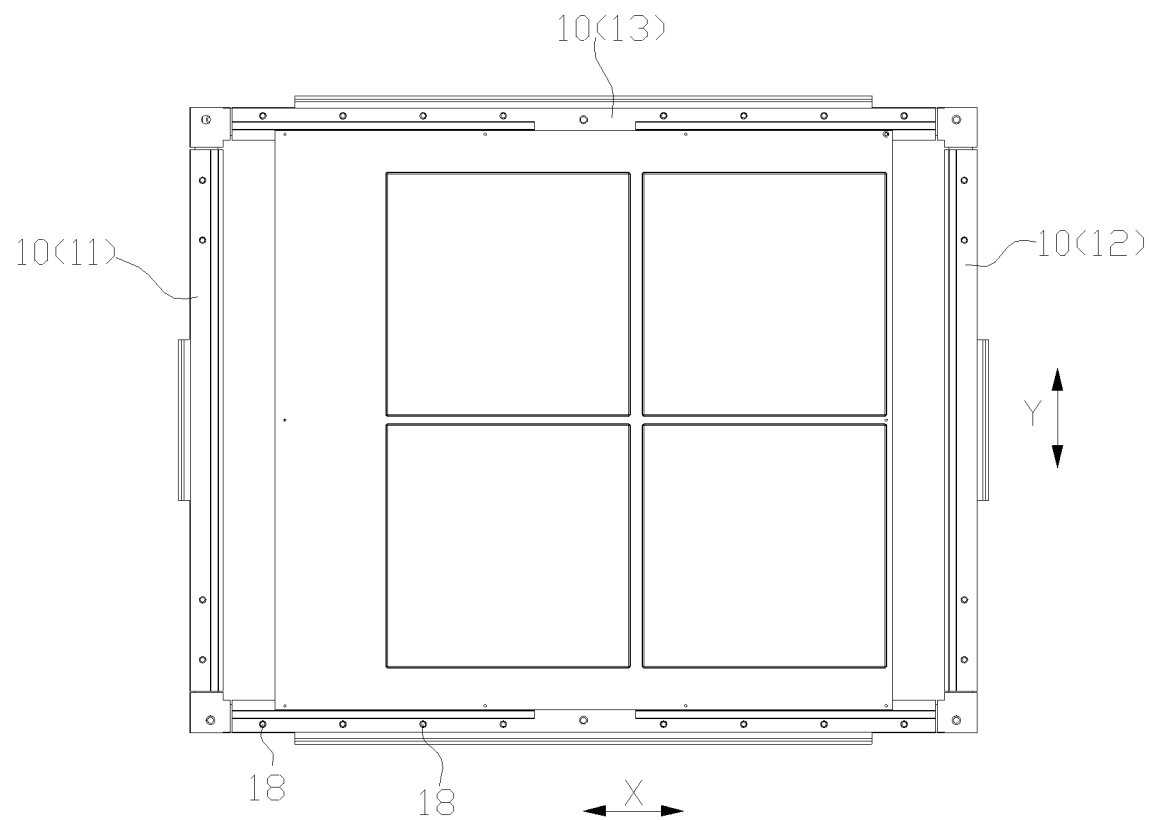
FIG. 13 is an assembling view of a chassis shown FIG. 11.

In some embodiments, please referring to FIG. 13, FIG. 13 is an assembling view of a chassis 100 shown FIG. 11. The chassis 100 further includes a locking unit 18, where the locking unit 18 is configured to lock or release the two adjacent movable bodies 10. When the locking unit 18 locks the two adjacent movable bodies 10, relative positions of the two adjacent movable bodies 10 are fixed; and when the locking unit 18 releases the two adjacent movable bodies 10, relative positions of the two adjacent movable bodies 10 are adjustable.

After the length of the chassis 100 is adjusted, two adjacent movable bodies 10 can be locked through the locking unit 18, such that relative positions of the two adjacent movable bodies 10 are fixed to facilitate mounting of the vehicle body 200 onto the chassis 100; and when it is necessary to adjust the length of the chassis 100, two adjacent movable bodies 10 can be released through the locking unit 18 and by adjusting relative positions of the two adjacent movable bodies 10, adjustment for the length of the chassis 100 can be realized.

It should be noted that one or more locking units 18 can be provided between the two adjacent movable bodies 10. With an example of the chassis 100 including a first movable body 11, a second movable body 12 and a third movable body 13, one or more locking units 18 can be provided between the first movable body 11 and the third movable body 13, and one or more locking units 18 can also be provided between the second movable body 12 and the third movable body 13. In FIG. 13, a plurality of locking units 18 are provided between the first movable body 11 and the third movable body 13 and a plurality of locking units 18 are provided between the second movable body 12 and the third movable body 13.

Figure 14:
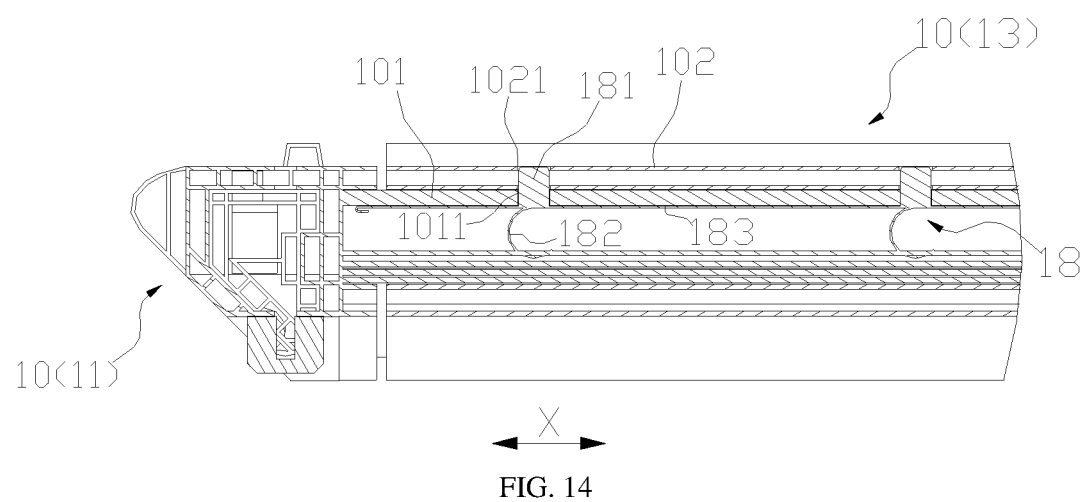
FIG. 14 is a local section view of a chassis shown FIG. 13.

Optionally, please referring to FIG. 14, FIG. 14 is a local section view of a chassis 100 shown FIG. 13. One movable body 10 of the two adjacent movable bodies 10 is provided with a first plugging portion 101, and the other movable body 10 of the two adjacent movable bodies 10 is provided with a second plugging portion 102. The first plugging portion 101 is movably inserted into the second plugging portion 102 along the first preset direction, such that the two adjacent movable bodies 10 restrict each other and an entirety consisting of the two adjacent movable bodies 10 is of favorable stability. The locking unit 18 is configured to lock or release the first plugging portion 101 and the second plugging portion 102.

Optionally, each locking unit 18 includes a locking pin 181 and an elastic piece 182. The locking pin 181 is movably provided at the first plugging portion 101, where with a plurality of locking holes 1021 arranged at an interval on the second plugging portion 102 along the first preset direction X, the locking pin 181 is configured for selective plugging into one locking hole 1021. The elastic piece 182 acts between the locking pin 181 and the first plugging portion 101 for providing an elastic force to the locking pin 181 so as to enable the locking pin 181 to be inserted into one locking hole 1021 aligned therewith.

Through the elastic piece 182, an elastic force is provided for the locking pin 181, enabling the locking pin 181 to be inserted into the locking hole 1021 to realize locking of the first plugging portion 101 and the second plugging portion 102. The locking unit 18 of such a structure is simple in structure. The locking pin 181 can lock the first plugging portion 101 and the second plugging portion 102 automatically in the relative moving process of the first plugging portion 101 and the second plugging portion 102. Certainly, after the locking pin 181 exits the locking hole 1021 under an external force, the locking pin 181 will release the first plugging portion 101 and the second plugging portion 102, in which case relative positions of the first plugging portion 101 and the second plugging portion 102 can be adjusted.

Illustratively, the first plugging portion 101 is a hollow structure, a sliding hole 1011 supplied for the locking pin 181 to move is provided on the first plugging portion 101, and the moving direction of the locking pin 181 in the sliding hole 1011 is perpendicular to the first preset direction X. The elastic piece 182 is provided in the first plugging portion 101 and the elastic piece 182 abuts against the locking pin 181. The elastic piece 182 can be a spring piece, a spring and any other element that can apply an elastic force to the locking pin 181.

Optionally, a plurality of locking units 18 are provided between the first plugging portion 101 and the second plugging portion 102, and the locking pin 181 of the plurality of locking units 18 can be connected on one same bar piece 183, thereby realizing simultaneous movement of all locking pins 181. When an external force is applied to one locking pin 181 to make it exit the locking hole 1021 corresponding thereto, the remaining locking pin 181 also exits the locking hole 1021 under the driving of the bar piece 183, thereby realizing rapid releasing of the first plugging portion 101 and the second plugging portion 102.

With an example of taking the first movable body 11 and the third movable body 13 as two adjacent movable bodies 10, the first connecting portion 1111 (shown in FIG. 11) and the third connecting portion 1121 (shown in FIG. 11) of the first movable body 11 are the first plugging portion 101, the first longitudinal beam 131 (shown in FIG. 11) of the third movable body 13 is configured for a part which plug-cooperates with the first connecting portion 1111, and the second longitudinal beam 132 (shown in FIG. 11) is configured for a part which plug-cooperates with the third connecting portion 1121, that is the second plugging portion 102.

It should be noted that as shown in FIG. 11, in a case where the first movable body 11 is a structure with a width adjustable in a second preset direction Y, the second connecting portion 1112 of the first connecting beam 111 and the external cross beam 113 can also be locked through the locking unit 18, and the fourth connecting portion 1122 of the second connecting beam 112 and the external cross beam 113 can also be locked through the locking unit 18.

Figure 15:
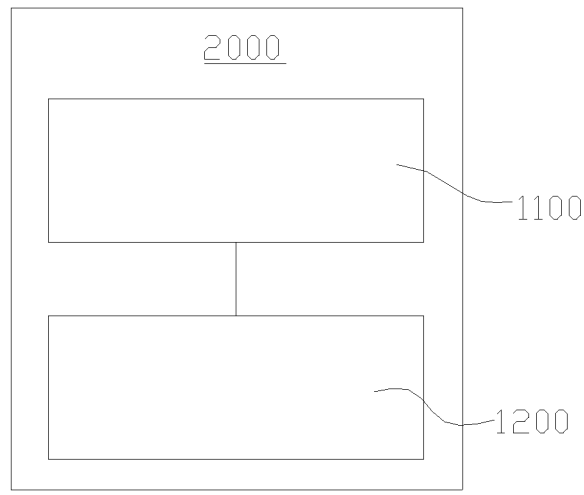
FIG. 15 is a schematic block diagram of a device for manufacturing a vehicle provided in some embodiments of the present application.

Please referring to FIG. 15, FIG. 15 is a schematic block diagram of a device 2000 for manufacturing a vehicle provided in some embodiments of the present application, where the device 2000 for manufacturing a vehicle includes a providing apparatus 1100 and a mounting apparatus 1200.

The providing apparatus 1100 is configured for providing a vehicle body 200 and a chassis 100. Where, as shown in FIG. 6, the chassis 100 includes at least two movable bodies 10 that are continuously arranged along a first preset direction X, each movable body 10 is provided at an adjacent movable body 10 thereof with a position adjustable in the first preset direction X, and by adjusting a position of at least one movable body 10 in the first preset direction X, a length of the chassis 100 in the first preset direction X can be changed so as to enable the chassis 100 to adapt to the vehicle body 200 of a different length.

The providing apparatus 1200 is configured for mount the vehicle body 200 onto the chassis 100.

It should be noted that the chassis 100 provided by the providing apparatus 1100 can be the chassis 100 provided in any embodiment described above.

Figure 16:
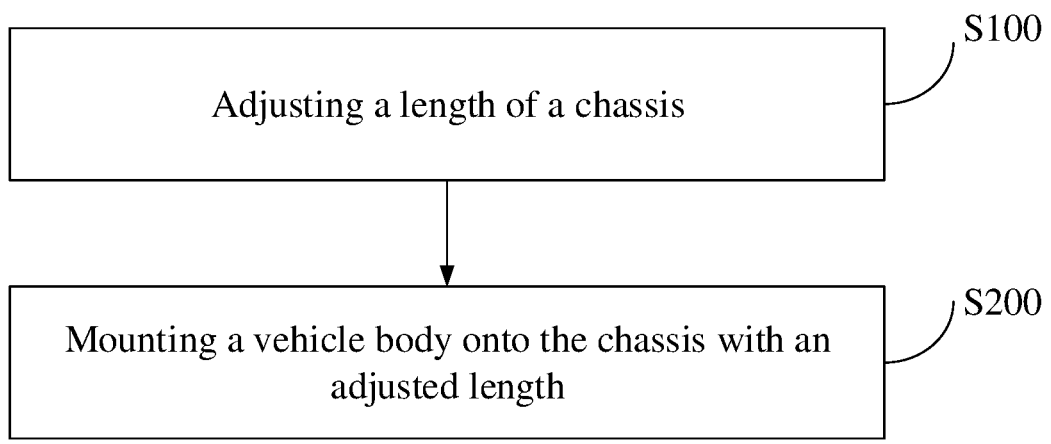
FIG. 16 is a flow chart of a method for manufacturing a vehicle provided in some embodiments of the present application.

Please referring to FIG. 16, FIG. 16 is a flow chart of a method for manufacturing a vehicle 1000 provided in some embodiments of the present application, the method for manufacturing a vehicle 1000 including:

S100: adjusting a length of a chassis 100; and
S200: mounting a vehicle body 200 onto the chassis 100 with an adjusted length;

Where, as shown in FIG. 6, the chassis 100 includes at least two movable bodies 10 that are continuously arranged along a first preset direction X, each movable body 10 is provided at an adjacent movable body 10 thereof with a position adjustable in the first preset direction X, and by adjusting a position of at least one movable body 10 in the first preset direction X, a length of the chassis 100 in the first preset direction X can be changed so as to enable the chassis 100 to adapt to the vehicle body 200 of a different length.

It should be noted that the chassis mentioned in the method for manufacturing a vehicle 1000 can be the chassis 100 provided in any above embodiment.

It should be noted that in absence of a conflict, embodiments of the present application and features in the embodiments may be combined to each other.

Although the present application has been described with reference to preferred embodiments, various improvements can be made thereto and equivalents can be configured for replacement of members therein without departing from the scope of the present application. In particular, as long as a structural conflict does not exist, each technical feature mentioned in each embodiment can be combined in any manner. The present application is not restricted to particular embodiments disclosed herein, but to include all technical solutions falling in the scope of the claims.

What is claimed is:

1. A chassis for a vehicle, wherein the chassis comprises at least two movable bodies continuously arranged along a first preset direction;
   each movable body being provided at an adjacent movable body thereof with a position adjustable in the first preset direction, and by adjusting a position of at least one movable body in the first preset direction, a length of the chassis in the first preset direction being changed so as to enable the chassis to adapt to a vehicle body of a different length;
   wherein the at least two movable bodies comprise:
      a first movable body for mounting a front wheel; and
      a second movable body for mounting a rear wheel;
   the at least two movable bodies further comprises a third movable body provided with an accommodating space for accommodating a battery cell; and
   the first movable body, the third movable body and the second movable body are arranged in order in the first preset direction;
   the third movable body comprises:
      a first longitudinal beam arranged along the first preset direction;
      a second longitudinal beam arranged along the first preset direction;
      a first cross beam arranged along a second preset direction and connected between the first longitudinal beam and the second longitudinal beam; and
      a second cross beam arranged along the second preset direction and connected between the first longitudinal beam and the second longitudinal beam;
      wherein the first longitudinal beam, the second longitudinal beam, the first cross beam, and the second cross beam jointly define the accommodating space;
      the first cross beam is provided at the first longitudinal beam and the second longitudinal beam with a position adjustable along the first preset direction, the first cross beam is connected to the first movable body, and by adjusting a position of the first movable body, a position of the first cross beam can be changed to adjust a size of the accommodating space; and/or the second cross beam is provided at the first longitudinal beam and the second longitudinal beam with a position adjustable along the first preset direction, the second cross beam is connected to the second movable body, and by adjusting a position of the second movable body, a position of the second cross beam can be changed to adjust a size of the accommodating space.

2. The chassis according to claim 1, wherein the first movable body comprises:
a first connecting beam provided at the first longitudinal beam with a position adjustable in the first preset direction;
a second connecting beam provided at the second longitudinal beam with a position adjustable in the first preset direction; and
an external cross beam, through which the first connecting beam and the second connecting beam are connected.

3. The chassis according to claim 2, wherein the first connecting beam is provided at one end of the external cross beam with a position adjustable in the second preset direction; and
the second connecting beam is provided at another end of the external cross beam with a position adjustable in the second preset direction.

4. The chassis according to claim 3, wherein the first connecting beam comprises a first connecting portion and a second connecting portion connected to the first connecting portion;
the second connecting beam comprises a third connecting portion and a fourth connecting portion connected to the third connecting portion;
the first connecting portion and the third connecting portion are respectively configured to be inserted into and matched with the first longitudinal beam and the second longitudinal beam in the first preset direction; and
the second connecting portion and the fourth connecting portion are respectively configured to be inserted into and matched with two ends of the external cross beam in the second preset direction.

5. The chassis according to claim 1, wherein the first cross beam is a telescopic structure that is telescopic along the second preset direction; and
the second cross beam is a telescopic structure that is telescopic along the second preset direction.

6. The chassis according to claim 1, wherein the third movable body further comprises:
a support beam, wherein at least one support beam is connected between the first longitudinal beam and the second longitudinal beam and/or between the first cross beam and the second cross beam to split the accommodating space into a plurality of accommodating grids for accommodating the battery cell.

7. The chassis according to claim 1, wherein the chassis further comprises:
a locking unit for locking or releasing two adjacent movable bodies;
when the locking unit locks the two adjacent movable bodies, relative positions of the two adjacent movable bodies are fixed; and
when the locking unit releases the two adjacent movable bodies, relative positions of the two adjacent movable bodies are adjustable.

8. The chassis according to claim 7, wherein one movable body of the two adjacent movable bodies is provided with a first plugging portion, and the other movable body of the two adjacent movable bodies is provided with a second plugging portion;
the first plugging portion is movably inserted into the second plugging portion along the first preset direction; and
the locking unit is configured to lock or release the first plugging portion and the second plugging portion.

9. The chassis according to claim 8, wherein each locking unit comprises:
a locking pin movably provided at the first plugging portion, wherein with a plurality of locking holes arranged on the second plugging portion at intervals along the first preset direction, the locking pin is configured to be selective inserted into one locking hole; and
an elastic piece acting between the locking pin and the first plugging portion for providing an elastic force to the locking pin so as to enable the locking pin to be inserted into one locking hole aligned therewith.

10. A vehicle, wherein the vehicle comprises:
a vehicle body, and
the chassis according to claim 1, wherein the vehicle body is connected to the chassis.

11. The vehicle according to claim 10, wherein the vehicle body is detachably connected to the chassis.

12. The vehicle according to claim 11, wherein the vehicle further comprises:
a locking assembly, through which the vehicle body and the chassis are detachably connected.

13. The vehicle according to claim 12, wherein the locking assembly comprises:
a locking piece comprising a limiting portion and a rod portion connected to the limiting portion, wherein an inserting hole is provided on the rod portion, and the rod portion is configured to be penetrated into the vehicle body and the chassis; and
a wedge block configured to compact the vehicle body and the chassis jointly together with the limiting portion upon being inserted into the inserting hole.

* * * * *